United States Patent
Le Nouveau

[19]

[11] Patent Number: 6,085,798
[45] Date of Patent: Jul. 11, 2000

[54] FLEXIBLE PIPE IN WHICH THE CREEP OF A SEALING LINER INTO THE REINFORCEMENT IS RESTRICTED

[75] Inventor: Joël Le Nouveau, Yainville, France

[73] Assignee: Coflexip, Paris, France

[21] Appl. No.: 09/117,672

[22] PCT Filed: Jan. 31, 1997

[86] PCT No.: PCT/FR97/00190

§ 371 Date: Aug. 3, 1998

§ 102(e) Date: Aug. 3, 1998

[87] PCT Pub. No.: WO97/28393

PCT Pub. Date: Aug. 7, 1997

[30] Foreign Application Priority Data

Feb. 2, 1996 [FR] France ................................. 96 01.290

[51] Int. Cl.[7] .................................................. F16L 11/10
[52] U.S. Cl. ........................... 138/125; 138/130; 138/153
[58] Field of Search .................................... 138/124, 125, 138/127, 129, 130, 153

[56] References Cited

U.S. PATENT DOCUMENTS

| | | | |
|---|---|---|---|
| 1,104,778 | 7/1914 | Cobb ........................................ | 138/126 |
| 2,143,852 | 1/1939 | Anderson ................................. | 138/130 |
| 3,481,368 | 12/1969 | Vansickle et al. ....................... | 138/125 |
| 3,905,398 | 9/1975 | Johansen et al. . | |
| 4,106,968 | 8/1978 | Kutnyak et al. ......................... | 138/130 |
| 4,276,908 | 7/1981 | Horne ...................................... | 138/125 |
| 4,343,333 | 8/1982 | Keister .................................... | 138/125 |
| 4,384,595 | 5/1983 | Washkewicz et al. .................. | 138/127 |
| 4,553,568 | 11/1985 | Piccoli et al. ............................ | 138/125 |
| 4,679,599 | 7/1987 | Newberry et al. . | |
| 4,850,395 | 7/1989 | Briggs ..................................... | 138/125 |
| 4,867,205 | 9/1989 | Bournazel et al. ...................... | 138/130 |
| 4,898,512 | 2/1990 | Searfoss et al. ......................... | 138/124 |
| 5,562,126 | 10/1996 | Briand et al. ............................ | 138/127 |

FOREIGN PATENT DOCUMENTS

| | | |
|---|---|---|
| 0596147 | 5/1994 | European Pat. Off. . |
| 1075332 | 10/1954 | France . |
| 1394036 | 7/1965 | France . |
| 2699979 | 7/1994 | France . |

*Primary Examiner*—James Hook
*Attorney, Agent, or Firm*—Ostrolenk, Faber, Gerb & Soffen, LLP

[57] ABSTRACT

A flexible pipe including at least one sealing liner (1); an assembly (3) of external reinforcements for withstanding the physical and chemical stress to which the flexible pipe is exposed, which assembly particularly comprises a reinforcement (2) resistant to the pressure of the fluid to be conveyed and consisting of non-contiguous coils (7,8) wound around said sealing liner (1) in a predetermined direction (e); and an intermediate strip (11) arranged between the pressure-resistant reinforcement (2) and the sealing liner (1), and wound around said sealing liner in a direction parallel or opposite to the winding direction (e) of the coils of the pressure-resistant reinforcement. The intermediate strip (11) has a low modulus of stiffness in said winding direction (3) around the sealing liner, and a high strength and modulus of stiffness in a transverse direction (e') relative to said coil winding direction.

51 Claims, 4 Drawing Sheets

FLEXIBLE PIPE IN WHICH THE CREEP OF A SEALING LINER INTO THE REINFORCEMENT IS RESTRICTED

BACKGROUND OF THE INVENTION

The present invention relates to a flexible pipe for conveying over long distances a fluid at high pressure and the temperature of which may be high, such as a gas, crude oil, water or other fluids.

A flexible pipe generally comprises, from the inside outwards, an internal sheath, made of a plastic capable more or less of withstanding the chemical action of the fluid to be transported, a first pressure armor layer which mainly resists the pressure developed by the fluid in the sealing internal sheath, the said first pressure armor layer generally also being known as the vault pressure, possibly a second tensile armor pressure which mainly withstands the tension produced especially by the pressure of the fluid, when this pressure is high, an external protective sheath also made of a plastic.

In some instances, the flexible pipe comprises an armor layer, arranged over the internal sheath and which simultaneously withstands both the effects of tension directed longitudinally along the axis of the flexible pipe and the circumferential component of the internal fluid-pressure.

The pressure armor layer consists of at least one winding with non-contiguous coils in order to give the flexible pipe a certain amount of flexibility. The expression non-contiguous coils is understood to mean coils between which a certain space is left.

Under the effect of the internal pressure and/or of the temperature developed by the fluid, the internal sheath, which is relatively flexible, is pressed against the pressure armor layer and tends to penetrate one or more of the spaces between coils. The tendency of the internal sheath to penetrate or creep increases with time and/or the severe service conditions of the flexible pipe, for example when the fluid to be conveyed flows at high pressure (several hundreds of bar) and high temperature (above 100° C.), a high temperature generally reducing the rigidity of the internal sheath. When the internal sheath gradually penetrates the said spaces, either cracks are produced which thus affect the sealing function of the sheath, or one or more local ruptures of the sheath may even occur, the consequence of such incidents being that fluid passes out of the sheath which no longer provides the required sealing.

Several solutions have been proposed and/or adopted in order to limit or in an attempt to prevent the creeping of the sheath into the spaces between coils of the pressure arch.

One solution, the simplest, consists in choosing a material and a great thickness for the sheath, so that it has better mechanical performance and higher chemical resistance. The drawback of this solution is twofold: it is more difficult to produce the flexible pipe because of the large size of the sheath and the cost of manufacture is very high.

Another solution consists in using a more precious material in order to keep the sheath to an acceptable thickness. Thus, instead of using a polyethylene to make the sheath, use has been made of a polyamide, the cost of which is very markedly higher than that of polyethylene.

Other solutions which in some cases are not directly related to the subject-matter of this invention are proposed and described in WO-A-82/01159, U.S. Pat. No. 3,880,195, EP-A-0,166,385, EP-A-0,147,288, FR-A-2,465,416 and FR-A-2,417,707.

The prior art most closely related to the invention consists of documents U.S. Pat. No. 3,729,028 and FR-A-2,590,646.

In document U.S. Pat. No. 3,729,028, the sealing internal sheath comprises a wound strip but neither the structure nor the mechanical properties of the strip, apart from the fact that it is of rectangular section, are described or even suggested.

Document FR-A-2,590,646, like the present invention, uses an intermediate strip capable of restricting the creeping of the internal sheath between the coils of the pressure armor layer for resisting the internal pressure. According to that document, the intermediate strip, which may be wound around the internal sheath in the direction of winding of the coils of the pressure armor layer or in the opposite direction, needs to have a high elastic modulus in the direction of winding. For that, and with the purpose of obtaining satisfactory results, it is recommended that use be made, for producing the tape, of substantially uni-directional fibres extending in the direction of winding and coated in a synthetic resin and preferably in a resin that is at least partially thermoplastic, which can possibly be fixed by bonding or melting. The transverse modulus of the strip is low so as to keep the pipe flexible. In the examples illustrated, the elastic modulus in the direction of winding has to be equal to at least 10,000 MPa, it being possible for the longitudinal fibres to be made of several E, R or S glass fibres, carbon fibres, silicon carbide, polyethylene with a high molecular mass, or aromatic polyamide. However, no mention is made of the structure of the strip, except that it comprises longitudinal fibres with a high elastic modulus and that the strip is wound under low tension, for example of the order of 30 daN.

But, only the longitudinal fibres offer resistance to the internal pressure, whereas no resistance is offered to the internal pressure between the longitudinal fibres. This being the case, the internal sheath tends to deform the intermediate strip and therefore to creep between the coils of the pressure armor layer and this is because of the low resistance offered by the transverse filaments. In order possibly to overcome such a drawback, it is therefore recommended that several intermediate strips be wound, superimposed on one another, and preferably wound alternately, something which not only increases the overall weight of the flexible pipe, but also prohibitively increases the cost of manufacture. In fact, it would be necessary to employ as many non-oxidizing flame torches as there are superimposed strips in order to bring about surface melting of the polyethylene at the moment that each intermediate strip is brought into contact with the internal sheath on the one hand, and to use a greater number of carbon and aromatic-polyamide fibres, on the other hand. What is more, the constraints of winding with specific angles according to the envisaged application merely further increase the cost of manufacture, not to mention the other secondary products needed for manufacturing the intermediate strip, such as the coating for the longitudinal fibres in a resin to give them the required cohesion.

SUMMARY OF THE INVENTION

The object of the present invention is to propose a flexible pipe provided with an intermediate strip which prevents the sealing internal sheath from creeping between the coils of the winding of the pressure armor layer.

One subject of the present invention is a flexible pipe which is characterized in that it comprises an intermediate strip which has a low elastic modulus in the direction of winding around the sealing internal sheath and a high strength and elastic modulus in the direction transverse to the said direction of winding of the coils.

One advantage of the present invention lies in the fact that the anti-creep intermediate strip strongly resists the internal pressure of the fluid, thus considerably restricting the penetration or creep of the material of which the sealing internal sheath is made and does so for the essential reason that only those points of the strip which have the greatest mechanical strength oppose the said internal pressure.

According to another feature, the strip consists of crossed longitudinal filaments and transverse filaments, the transverse filaments having an elastic modulus and a mechanical strength which are high. The strip is preferably of woven type and is dry in all cases, that is to say comprises no or practically no binding material other than what is necessary for manufacturing and manipulating it and conventionally used in the manufacture of such strips. Thus it is no longer necessary to envisage stages of rigidifying and/or fixing some of its components, as was the case with the intermediate strips of the prior art.

In addition, the filaments of which the strip is made are rovings, each roving comprising filaments in a number and of a nature that are appropriate for giving them the desired mechanical properties. In one embodiment of the strip, the transverse filaments are inclined with respect to the longitudinal filaments by an angle of about 55° which is the angle of winding of the reinforcement filaments leading to a flexible pipe that is dimensionally stable under the effect of the internal pressure.

When the said weft filaments are wound at this equilibrium angle of approximately 55°, the said filaments practically do not move at all and therefore do not rub on the liner or on the pressure armor layer.

Furthermore, as the weft filaments are transverse to the gaps between coils of the pressure armor layer, they form a short "beam" which works in bending and effectively opposes the penetration of the internal sheath.

BRIEF DESCRIPTION OF THE DRAWINGS

Other features and advantages will become clear from reading the description of several embodiments of the invention, and from the appended drawings in which.

DESCRIPTION OF PREFERRED EMBODIMENTS

Figure 1:
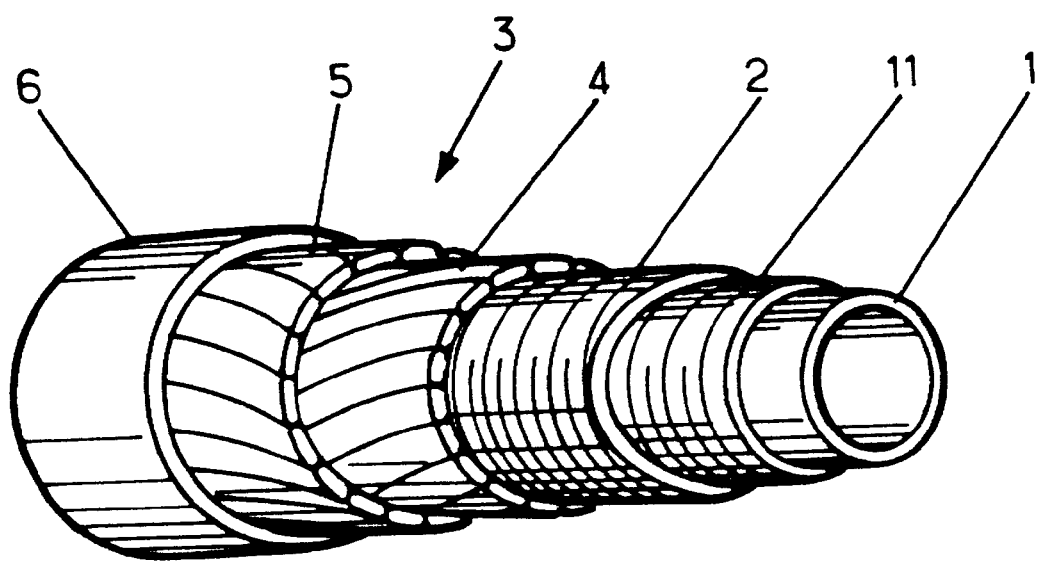
FIG. 1 is a part view in perspective of a flexible pipe according to the invention.
Figure 2:
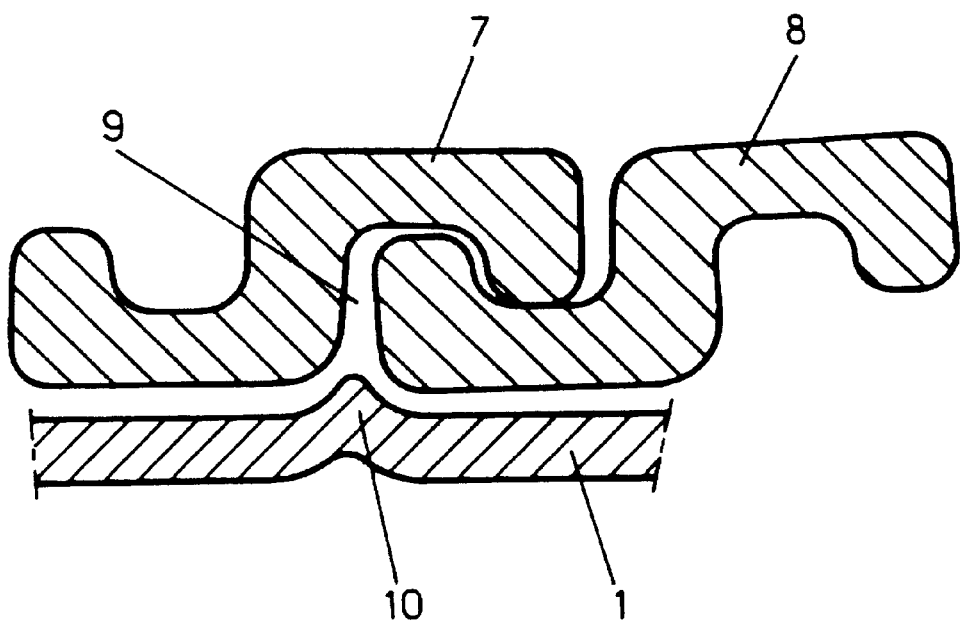
FIG. 2 is a schematic cross section of two non-contiguous coils of the pressure arch of the pipe depicted in FIG. 1, the anti-creep strip being omitted.

A flexible pipe of the smooth-bore type generally comprises, from the inside outwards, an internal sheath 1, of the polymeric type, a pressure armor layer or vault pressure 2, consisting of a winding of filaments of appropriate section, for example in the shape of a Z and called zeta-filament, as depicted in FIG. 2 or alternatively in the shape of a U or T, a tensile armor layer 3 that resists the axial tension in the longitudinal direction of the flexible pipe, the said tensile armor layer customarily consisting of one or more pairs of layers of winding 4,5 which are wound in opposite directions and inclined at an angle of less than 55°, and an outer sealing sheath 6, of the polymeric type. In some applications, the various armor layer or winding layers are separated from one another by a textile layer, made of plastic of the same type as or of a different type from the outer sealing sheath 6.

The pressure armor layer 2 consists (FIG. 3) of at least one winding in a direction e, with non-contiguous coils 7, 8 so that a space 9 is left between the two consecutive coils 7, 8. When the flexible pipe is pressurized by the fluid flowing at a relatively high temperature through the said pipe, the internal sheath 1 tends to deform and locally penetrate at the said spaces 9. Such penetration or creeping is depicted in FIG. 2 by waviness 10 in the thickness of the liner 1. The progressive deformations of the internal sheath 1 into the spaces 9 lead to cracking and even to one or more local ruptures, causing a loss of sealing, and the extent to which this is observed is all the greater, the larger the spaces 9 and the larger the diameter of the pipe. These phenomena of cracking and/or weakening of the internal sheath are amplified in pipes said to be dynamic, as opposed to static pipes.

Figure 3:
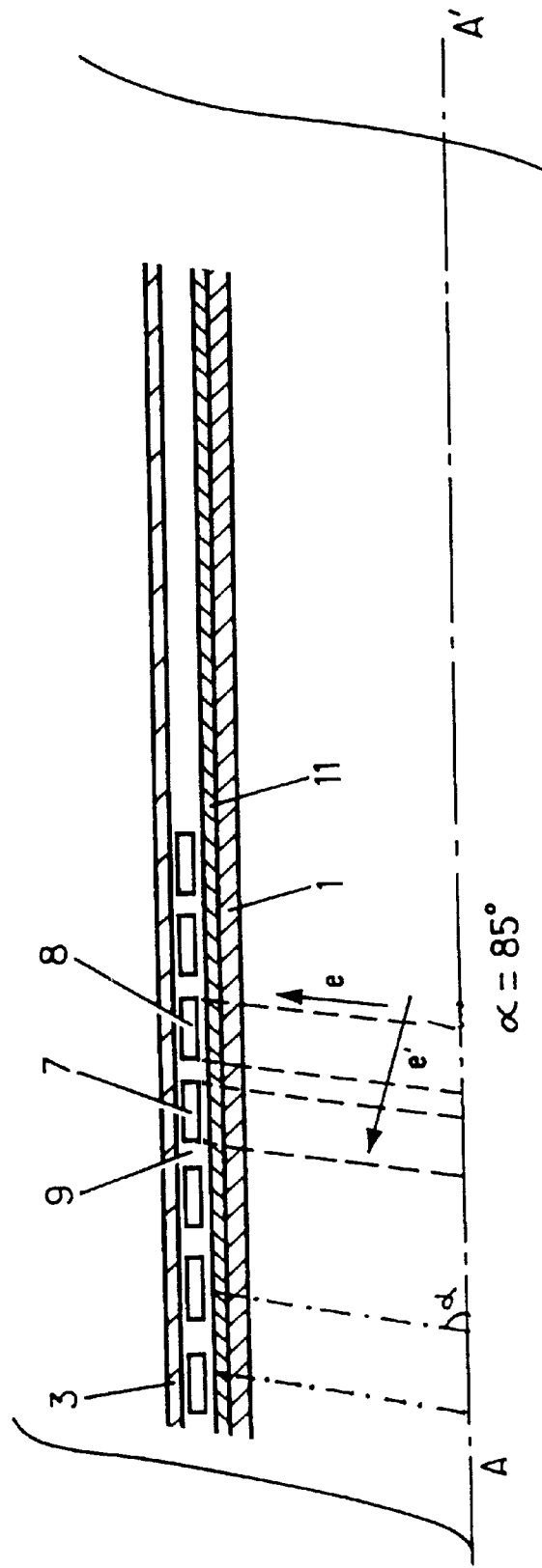
FIG. 3 is a partial cross-sectional view of the pipe of FIG. 1.

According to the present invention, an intermediate anti-creep strip 11 is inserted between the internal sheath 1 and the pressure armor layer 2. The strip 11 may be wound in a first direction, approximately in the same direction e as the direction of winding of the pressure armor layer 2, but forming an angle α of close to 90° and preferably between 80 and 85° with respect to the axis of symmetry AA' of the flexible pipe (FIG. 3). The strip 11 may also be wound in the opposite direction to the said first direction, with contiguous coils or overlapping coils.

Figure 4:
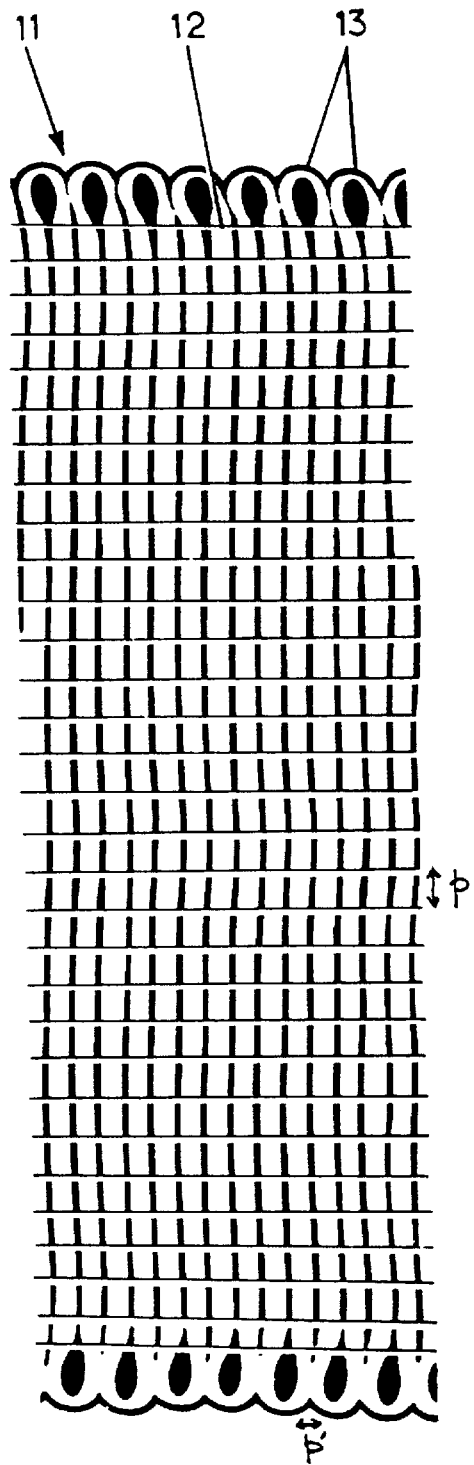
FIG. 4 is a plan view of the intermediate strip.

The strip 11 consists (FIG. 4) of crossed longitudinal warp filaments 12 and weft filaments 13 the direction e' of which is transverse to the direction e of winding of the coils 7,8, the strip 11 being produced with a loose weave. The warp filaments 12 have a low elastic modulus, compared with the weft filaments 13. By way of example, the elastic modulus of the warp filaments 12 is less than or equal to 10,000 MPa, whereas the elastic modulus of the weft filaments is at least equal to 50,000 MPa. Likewise, the grammage of the warp filaments 12 and of the weft filaments 13 is respectively between 40 and 100 g/m$^2$ and between 100 and 300 g/m$^2$, which leads to a strip with a mechanical strength of between 100 and 300 daN/5 cm in the direction of the warp filaments 12, and in excess of 1000 daN/5 cm in the direction of the weft filaments 13.

The loose weave of the strip 11 is produced in such a way that the pitch p between the warp filaments 12 is about 3 mm, whereas the pitch p' between the weft filaments 13 is about 1 mm.

Quite obviously, other methods of manufacturing the strip 11, such as knitting, may be envisaged. The same applies to the respective orientations of the warp filaments and of the weft filaments. The strip 11 of FIG. 4 comprises perfectly straight warp filaments 12 directed in the direction of winding of the strip and more or less perpendicular to the weft filaments 13. The strip 11 may also be produced in such a way that the weft filaments 13 are inclined, forming an angle of about 55° to the warp filaments 12.

As a preference, the warp filaments 12 are filamentary rovings made of polypropylene (PP), polyethylene, polyester, which are twisted, whereas the weft filaments 13 may also be filamentary rovings, not twisted, made of polyamide, carbon, titanium, etc., and the constituent monofilaments of which are distributed more uniformly between the weft filaments. A structure of this kind presents several advantages. The first is that it eliminates or reduces the holes in the strip 11, giving the latter a more uniform and compact appearance so that the internal pressure is exerted on weft filaments which are broad compared with the slender warp filaments. The second advantage is that it is possible, in extremis, to use just one thickness of intermediate strip 11.

When the strip 11 is being wound around the internal sheath 1, this can be done with contiguous coils or with overlapping coils, the degree of overlap being between 10% and 50%. Likewise, to obtain a better distribution of the internal pressure across the intermediate strip 11 and to eliminate the risk of pressure in the holes in the said strip, it is preferable for two strips 11 to be superposed on one another, in the same direction or in opposite directions. This is all the more possible if the strip 11 according to the invention is of small thickness between 50 and 70/100 mm.

Note that the strip 11 according to the invention is wound dry when it is wound around the internal sheath even though a small amount of binding material is used to manufacture it, which binding material is needed for holding the warp filaments and weft filaments together temporarily during weaving for example.

As a preference, the width of the intermediate strip is at least greater than the spacing between coils of the pressure armor layer. Advantageously, and in a preferred embodiment, the width of the strip is equal to at least twice the said spacing.

What is claimed is:

1. A flexible pipe for conveying fluids comprising:
   a sealing internal sheath;
   an assembly of external armor layers around the sheath for withstanding physico-chemical stresses applied to the sheath, the assembly comprising a pressure resistant armor layer resistant to the pressure of the fluid to be conveyed in the sheath, the armor layer comprising non-contiguous coils with gaps therebetween wound around the internal sheath in a first winding direction;
   an intermediate strip between the armor layer and the sheath, the intermediate strip being wound in a second direction around the internal sheath, the wound intermediate strip bridging said gaps between the armor layer coils so as to prevent material flow into said gaps from said internal sheath,
   wherein the intermediate strip has a low modulus of stiffness in the second direction of winding of the intermediate strip around the sheath and a high strength and modulus of stiffness in a direction transverse to the first armor layer coil winding direction.

2. The flexible pipe of claim 1, wherein the second intermediate strip winding direction is parallel to the first coil winding direction.

3. The flexible pipe of claim 1, wherein the second intermediate strip winding direction is a direction opposite to the first coil winding direction.

4. The flexible pipe of claim 1, wherein the intermediate strip has the high strength and modulus of stiffness in a direction transverse to the first coil winding direction.

5. The flexible pipe of claim 1, wherein the second direction of winding of the intermediate strip around the sealing internal sheath is opposite to the first direction of winding of the armor layer coils.

6. The flexible pipe of claim 1, wherein the non-contiguous coils of the armor layer are respectively spaced apart from neighboring ones of the armor layer coils and the width of the intermediate strip is at least twice the size of the space between adjacent ones of the armor layer coils.

7. The flexible pipe of claim 1, wherein the intermediate strip is of knitted filaments.

8. The flexible pipe of claim 1, further comprising at least two of the intermediate strips, with a first one of the intermediate strips being wound around the sealing internal sheath and a second one of the intermediate strips being wound around the first intermediate strips.

9. The flexible pipe of claim 8, wherein the intermediate strips are wound around the sealing internal sheath in mutually opposite directions with different directions of incline with respect to each other.

10. The flexible pipe of claim 1, wherein the intermediate strip second winding direction is along a helix path and angled to the axis of the sheath of at most 90°.

11. The flexible pipe of claim 10, wherein the angle to the axis of the sheath is in the range of 80°–85°.

12. The flexible pipe of claim 10, wherein the windings of the intermediate strip overlap on about 50% of their width.

13. The flexible pipe of claim 10, wherein the intermediate strip is wound on the sealing internal sheath with overlapping windings.

14. The flexible pipe of claim 13, wherein the windings of the intermediate strip overlap over more than 10% of their width.

15. The flexible pipe of claim 1, wherein the intermediate strip is comprised of crossed filaments and some of the filaments extend longitudinally and are arranged in the second direction of winding of the strip.

16. The flexible pipe of claim 15, wherein the intermediate strip crossed filaments are comprised of warp filaments extending longitudinally along the intermediate strip and of weft filaments that are inclined by an angle of about 55° with respect to the direction of extension of the warp filaments.

17. The flexible pipe of claim 15, wherein some of the filaments are transverse filaments having a high mechanical strength exceeding 1000 daN/cm.

18. The flexible pipe of claim 15, wherein the intermediate strip is a woven strip, wherein the intermediate strip filaments include warp filaments arranged in the second direction of winding of the intermediate strip and include weft filaments transverse in direction to the warp filaments and extending in a direction transverse to the second strip winding direction.

19. The flexible pipe of claim 18, wherein the weft filaments have a high mechanical strength exceeding 1,000 daN/cm.

20. The flexible pipe of claim 18, wherein the weft filaments comprise filamentary rovings with an elastic modulus of at least 50,000 MPa and a grammage in the range of 100–300 g/m$^2$.

21. The flexible pipe of claim 18, wherein the intermediate strip is designed with a rupture load in the direction of the warp filaments in the range between 100 and 300 daN/5 cm.

22. The flexible pipe of claim 18, wherein the intermediate strip includes more of the transverse filaments than the longitudinal filaments in any measured square area of the intermediate strip.

23. The flexible pipe of claim 18, wherein the weft filaments are selected from the group of materials consisting of polyamide, carbon and titanium.

24. The flexible pipe of claim 18, wherein the warp filaments of the intermediate strip are of a plastic selected from the group consisting of polypropylene, polyethylene and polyester.

25. The flexible pipe of claim 24, wherein the weft filaments are selected from the group of materials consisting of polyamide, carbon and titanium.

26. The flexible pipe of claim 18, wherein the warp filaments comprise filamentary rovings having a Young's modulus of each filamentary roving which is at most equal to 10,000 MPa and a grammage in the range between 50 and 100 g/m$^2$.

27. The flexible pipe of claim 26, wherein the weft filaments comprise filamentary rovings with an elastic modulus of at least 50,000 MPa and a grammage in the range of 100–300 g/m².

28. A flexible pipe for conveying fluids comprising:
a sealing internal sheath;
an assembly of external armor layers around the sheath for withstanding physico-chemical stresses applied to the sheath, the assembly comprising a pressure resistant armor layer resistant to the pressure of the fluid to be conveyed in the sheath, the armor layer comprising non-contiguous coils wound around the internal sheath in a first winding direction;
an intermediate strip between the armor layer and the sheath, the intermediate strip being wound in a second direction around the internal sheath, the wound intermediate strip extending in such direction around the inner sheath and having such design that the intermediate strip has a low modulus of stiffness in the second direction of winding of the intermediate strip around the sheath and a high strength and modulus of stiffness in a direction transverse to the first armor layer coil winding direction;
wherein the intermediate strip is a woven strip comprised of crossed filaments;
wherein the intermediate strip filaments include warp filaments arranged longitudinally in the second direction of winding of the intermediate strip and include weft filaments transverse in direction to the warp filaments and extending in a direction transverse to the second strip winding direction; and
wherein each warp filament is a twisted filament.

29. The flexible pipe of claim 28, wherein the weft filaments are untwisted filaments.

30. A flexible pipe for conveying fluids comprising:
a sealing internal sheath;
an assembly of external armor layers around the sheath for withstanding physico-chemical stresses applied to the sheath, the assembly comprising a pressure resistant armor layer resistant to the pressure of the fluid to be conveyed in the sheath, the armor layer comprising non-contiguous coils wound around the internal sheath;
an intermediate strip between the armor layer and the sheath, the intermediate strip being wound around the internal sheath, the intermediate strip having a low modulus of stiffness in the direction of winding of the intermediate strip around the sheath and a high strength and modulus of stiffness in a direction transverse to said winding direction;
wherein the intermediate strip is a woven strip comprised of crossed filaments;
wherein the intermediate strip filaments include warp filaments arranged longitudinally in the direction of winding of the intermediate strip and include weft filaments transverse in direction to the warp filaments and extending in a direction transverse to the intermediate strip winding direction; and
wherein each warp filament is a twisted filament.

31. The flexible pipe of claim 30, wherein the weft filaments are untwisted filaments.

32. A flexible pipe for conveying fluids comprising:
a sealing internal sheath;
an assembly of external layers around the sheath for withstanding physico-chemical stresses applied to the sheath, the assembly comprising a pressure resistant armor layer resistant to the pressure of the fluid to be conveyed in the sheath, the armor layer comprising non-contiguous coils with gaps therebetween wound around the internal sheath;
an intermediate strip between the armor layer and the sheath, the intermediate strip being wound around the internal sheath, the wound intermediate strip bridging said gaps between the armor layer coils so as to prevent material flow into said gaps from said internal sheath,
wherein the intermediate strip has a low modulus of stiffness in a direction of winding of the intermediate strip around the sheath and a high strength and modulus of stiffness in a direction transverse to said winding direction.

33. The flexible pipe of claim 32, wherein the intermediate strip is a woven strip comprised of crossed filaments, including warp filaments arranged longitudinally in the direction of winding of the intermediate strip and weft filaments arranged transverse in direction to the warp filaments.

34. The flexible pipe of claim 33, wherein the weft filaments have a high mechanical strength exceeding 1000 daN/cm.

35. The flexible pipe of claim 33, wherein the weft filaments comprise filamentary rovings with an elastic modulus of at least 50,000 Mpa and a grammage in the range of 100–300 g/m².

36. The flexible pipe of claim 33, wherein the intermediate strip is designed with a rupture load in the direction of the warp filaments in the range between 100 and 300 daN/5 cm.

37. The flexible pipe of claim 33, wherein the warp filaments comprise filamentary rovings having a Young's modulus of each filamentary roving which is at most equal to 10,000 Mpa and a grammage in the range between 50 and 100 g/m².

38. The flexible pipe of claim 37, wherein the weft filaments comprise filamentary rovings with an elastic modulus of at least 50,000 Mpa and a grammage in the range of 100–300 g/m².

39. The flexible pipe of claim 33, wherein the intermediate strip includes more weft filaments than warp filaments in any given area of the intermediate strip.

40. The flexible pipe of claim 39, wherein a pitch between the warp filaments is greater than a pitch between the weft filaments.

41. The flexible pipe of claim 40, wherein said pitch between the warp filaments is about 3 mm and the pitch between the weft filaments is about 1 mm.

42. An intermediate strip for being wound around a sealing internal sheath and within an assembly of external layers in a flexible pipe for conveying fluids;
said intermediate strip having a low modulus of stiffness in a direction of winding of the intermediate strip around the sheath and a high strength and modulus of stiffness in a direction transverse to said winding direction.

43. The intermediate strip of claim 42, wherein the intermediate strip is a woven strip comprised of crossed filaments, including warp filaments arranged longitudinally in the direction of winding of the intermediate strip and weft filaments arranged transverse in direction to the warp filaments.

44. The intermediate strip of claim 43, wherein the weft filaments have a high mechanical strength exceeding 1000 daN/cm.

45. The intermediate strip of claim 43, wherein the weft filaments comprise filamentary rovings with an elastic modulus of at least 50,000 Mpa and a grammage in the range of 100–300 g/m².

46. The intermediate strip of claim 43, wherein the intermediate strip is designed with a rupture load in the direction of the warp filaments in the range between 100 and 300 daN/5 cm.

47. The intermediate strip of claim 43, wherein the warp filaments comprise filamentary rovings having a Young's modulus of each filamentary roving which is at most equal to 10,000 Mpa and a grammage in the range between 50 and 100 g/m².

48. The intermediate strip of claim 47, wherein the weft filaments comprise filamentary rovings with an elastic modulus of at least 50,000 Mpa and a grammage in the range of 100–300 g/m².

49. The intermediate strip of claim 43, wherein the intermediate strip includes more weft filaments than warp filaments in any given area of the intermediate strip.

50. The intermediate strip of claim 49, wherein a pitch between the warp filaments is greater than a pitch between the weft filaments.

51. The intermediate strip of claim 50, wherein said pitch between the warp filaments is about 3 mm and the pitch between the weft filaments is about 1 mm.

* * * * *